(12) United States Patent
Hegler

(10) Patent No.: US 8,794,948 B2
(45) Date of Patent: Aug. 5, 2014

(54) APPARATUS FOR THE CONTINUOUS PRODUCTION OF A TWIN WALL PIPE WITH AN INTEGRAL SOCKET

(71) Applicant: Ralph Peter Hegler, Bad Kissingen (DE)

(72) Inventor: Ralph Peter Hegler, Bad Kissingen (DE)

( * ) Notice: Subject to any disclaimer, the term of this patent is extended or adjusted under 35 U.S.C. 154(b) by 0 days.

(21) Appl. No.: 13/659,166

(22) Filed: Oct. 24, 2012

(65) Prior Publication Data

US 2013/0115324 A1 May 9, 2013

(30) Foreign Application Priority Data

Nov. 4, 2011 (EP) .................... 11187934

(51) Int. Cl.
| | | |
|---|---|---|
| B29C 47/90 | (2006.01) | |
| B29C 47/08 | (2006.01) | |
| B29C 47/92 | (2006.01) | |
| B29C 47/12 | (2006.01) | |
| B29C 49/00 | (2006.01) | |
| B29C 47/70 | (2006.01) | |
| B29C 47/00 | (2006.01) | |
| B29C 47/06 | (2006.01) | |
| B29C 47/56 | (2006.01) | |
| B29L 23/18 | (2006.01) | |
| B29L 16/00 | (2006.01) | |

(52) U.S. Cl.
CPC ........... *B29C 47/126* (2013.01); *B29C 49/0021* (2013.01); *B29C 47/70* (2013.01); *B29C 47/0023* (2013.01); *B29C 47/065* (2013.01); *B29C 47/0811* (2013.01); *B29C 47/005* (2013.01); *B29C 47/0033* (2013.01); *B29C 47/92* (2013.01); *B29C 47/56* (2013.01); *B29L 2023/18* (2013.01); *B29L 2016/00* (2013.01); *B29C 47/902* (2013.01)

USPC .............. 425/133.1; 425/233; 425/326.1; 425/336; 425/369; 425/396; 425/462

(58) Field of Classification Search
CPC ............ B29C 47/0023; B29C 47/0026; B29C 47/0033; B29C 47/0052; B29C 47/065; B29C 47/126; B29C 47/26; B29C 49/0021; B29C 2791/006; B29L 2023/186; B29L 2031/605
USPC .......... 425/72.1, 133.1, 233, 326.1, 336, 369, 425/396, 462
See application file for complete search history.

(56) References Cited

U.S. PATENT DOCUMENTS

| | | | |
|---|---|---|---|
| 3,677,676 A * | 7/1972 | Hegler ..................... | 425/504 |
| 5,124,109 A * | 6/1992 | Drossbach .............. | 264/508 |
| 5,320,797 A | 6/1994 | Hegler et al. | |
| 5,693,347 A | 12/1997 | Hegler | |
| 6,458,311 B1 | 10/2002 | Hegler | |
| 7,238,317 B2 | 7/2007 | Hegler | |
| 2002/0168437 A1* | 11/2002 | Chan et al. ............. | 425/133.1 |
| 2009/0236032 A1 | 9/2009 | Hegler | |
| 2012/0121750 A1 | 5/2012 | Hegler | |

FOREIGN PATENT DOCUMENTS

| | | |
|---|---|---|
| EP | 2116352 A1 | 11/2009 |
| WO | WO 2005/009720 A1 | 2/2005 |

* cited by examiner

*Primary Examiner* — Yogendra Gupta
*Assistant Examiner* — Joseph Leyson
(74) *Attorney, Agent, or Firm* — James B. Conte; Husch Blackwell LLP

(57) ABSTRACT

An apparatus for the continuous production of a twin wall pipe has mold block halves supplied in pairs to form a mold, and a pipe head, which has an external nozzle for the extrusion of an external hose and an internal nozzle for the extrusion of an internal hose. A support air and venting channel which is annular-cylindrical and concentric with respect to the center longitudinal axis of the pipe head opens out between the external nozzle and internal nozzle.

25 Claims, 8 Drawing Sheets

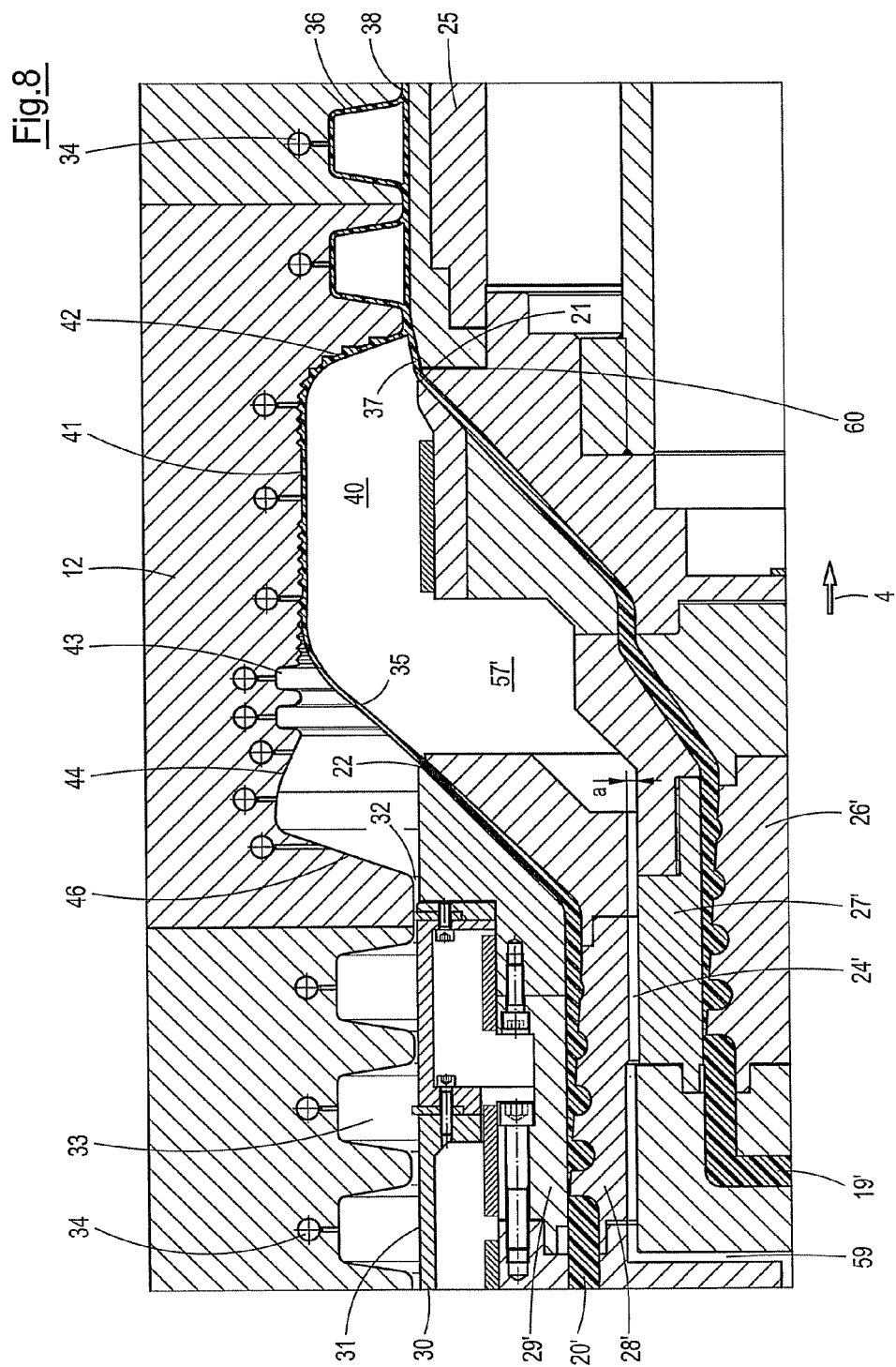

APPARATUS FOR THE CONTINUOUS PRODUCTION OF A TWIN WALL PIPE WITH AN INTEGRAL SOCKET

CROSS-REFERENCES TO RELATED APPLICATIONS

This application claims the priority of European patent application, Serial No. 11 187 934.2, filed Nov. 4, 2011, pursuant to 35 U.S.C. 119(a)-(d), the content of which is incorporated herein by reference in its entirety as if fully set forth herein.

FIELD OF THE INVENTION

The invention relates to an apparatus for the continuous production of a twin wall pipe consisting in a conveying direction of a smooth internal pipe and an external pipe welded thereto and provided with corrugations, and a first centre longitudinal axis, wherein mold block halves provided with annular mould recesses, supplementing one another in pairs in each case on a molding section to form a mould with a second centre longitudinal axis, are arranged in the circuit and guided in a conveying direction, wherein the mould recesses are connected to partial vacuum channels formed in the mold block halves, wherein a pipe head of at least one extruder is arranged upstream of the molding section, wherein the pipe head is provided with an external nozzle for the extrusion of an external hose and, downstream in the conveying direction, with an internal nozzle for the extrusion of an internal hose and, at its end located downstream in the conveying direction, with a calibrating mandrel, and wherein at least one support air channel opens out of the pipe head between the external nozzle and the internal nozzle.

BACKGROUND OF THE INVENTION

An apparatus of this type is known from EP 2 103 412 A1 (corresponding to US 2009/0236032 A1). In this case, a channel for the supply of support air opens into the space between the external nozzle and internal nozzle, it being possible to switch the support air on and off. A separate venting channel, which is constantly open to the atmosphere, in turn opens out of the region between the external nozzle and internal nozzle. An apparatus of a similar type is known from U.S. Pat. No. 5,320,797 B1, in which the venting in each case takes place by opening a solenoid valve arranged in the channel for the supply of support air, the supply of support air being interrupted.

The configuration with a constant connection to the atmosphere has basically proven to be advantageous in the production of large twin wall pipes made of polyolefins, in other words polyethylene and/or polypropylene. Large twin wall pipes are taken to mean here pipes with a nominal width ≥DN 250, the twin wall pipes comprising simple twin wall pipes and twin wall pipes with a double-layered integral socket.

It has been found that this system is still in need of improvement.

SUMMARY OF THE INVENTION

The invention is therefore based on an object of improving an apparatus of the type assumed at the outset in such a way that it is possible to control the air pressure in the space between the external hose and the internal hose with very simple means.

This object is achieved according to the invention in an apparatus according to the invention, in which the support air channel is configured as a support air and venting channel, which is constantly open to the atmosphere, is annular-cylindrical at least adjacent to the region between the internal nozzle and the external nozzle and is concentric with respect to the second centre longitudinal axis. Owing to the support air and venting channel, which has large dimensions or can have large dimensions, it is possible to easily compensate an air volume requirement that varies along the molding section between the melt stream. This is particularly useful in the case of large pipes, as when forming the corrugations, relatively large support air volumes are required, while when forming the corrugation valleys, where the internal hose is welded to the external hose, little or no support air at all is required. Not only can support air be supplied, but it can also be removed.

The configuration according to the invention, in which at least one additional gas channel opens out of the pipe head between the internal nozzle and the calibrating mandrel, in which at least one pair of mold block halves is provided with a socket recess, and in which the socket recess is limited by a transition face, which is upstream in the conveying direction, is particularly advantageous when it is provided that double-layered integral sockets are produced on the apparatus. It is possible here owing to the support air and venting channel that has large dimensions or can have large dimensions, on the one hand to achieve a rapid venting to the atmosphere, but on the other hand, also a rapid supply of atmospheric air during a pulsating widening of the internal hose to the integral socket. This takes place in that, apart from the support air, more or less ambient air can continue to flow thereafter depending on the requirement. This is an important effect with slightly fluctuating values of the partial vacuum at the mold block halves. This applies to the production of the double-layered integral socket, specifically, in particular, with regard to the requirements of the venting process during the transition from the socket formation back to the production of the normally corrugated double-walled twin wall pipe. The system is very stable. Particular sealing measures in the region of the start of the support air and venting channel are not necessary, as the entire system does not have to be pressure-tight and, consequently, nor is it. The support air is allocated here such that it supports the forming by the vacuum method in regions, but does not exert a dominating influence on the forming, in particular during the forming of the double-layered integral socket.

Further details, advantages and features emerge from the following description of embodiments with the aid of the drawings

BRIEF DESCRIPTION OF THE DRAWINGS

FIG. 7 shows a view corresponding to FIG. 2 of a modified pipe head and FIG. 8 shows an enlarged partial view from FIG. 7.

DESCRIPTION OF THE PREFERRED EMBODIMENTS

Figure 1:
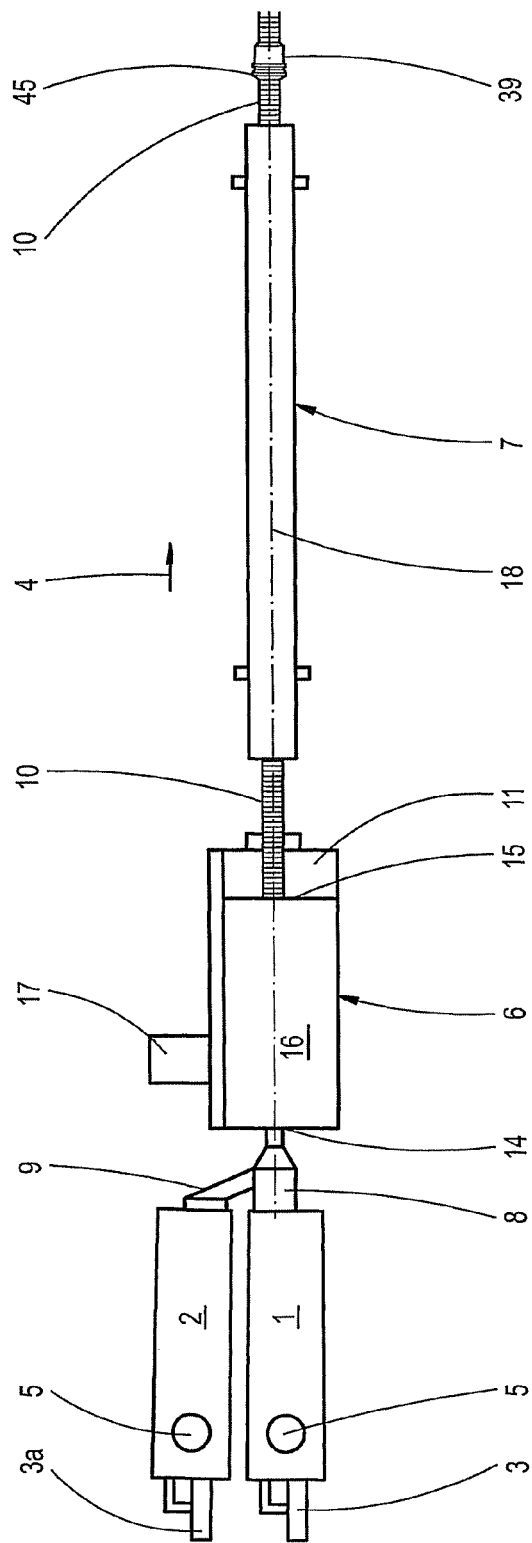
FIG. 1 shows a system, which substantially consists of two extruders, a corrugator and an additional cooling device, for producing twin wall pipes with integral sockets in a schematic plan view.

The system shown in FIG. 1 for producing twin wall pipes has two extruders 1, 2. These are in each case driven by a speed-controllable drive motor 3 or 3*a*, which—in relation to a conveying direction 4 of the entire system—is provided upstream in front of the supply hoppers 5 of the extruders 1, 2.

Downstream of the extruders 1, 2 in relation to the conveying direction 4, there is arranged a corrugator 6, a so-called corrugator, downstream of which is in turn arranged an additional cooling device 7. Attached to an extruder 1 arranged aligned with the corrugator 6 and the additional cooling device 7 is a cross pipe head 8, in other words an extrusion tool, which projects into the corrugator 6. The other extruder 2 arranged to the side of this extruder 1 is connected by a melt channel 9, which opens laterally into the cross pipe head 8, to the cross pipe head 8. As indicated schematically in FIG. 1, a twin wall pipe 10, which leaves the corrugator 6 in the conveying direction 4 and is cooled in the additional cooling device 7, is formed in the corrugator 6. Said twin wall pipe can then be cut into pieces of a suitable length behind this additional cooling device 7.

The structure of the corrugator 6 is known and conventional in practice. It is described, for example, in EP 0 563 575 B1 (corresponding to U.S. Pat. No. 5,320,797), to which reference is expressly made. It substantially has a machine table 11, on which the mold block halves 12, 12*a* are arranged. The mold block halves 12, 12*a* are joined on the machine table 11 in the conveying direction 4 to form a mold block pair 13, in each case, and guided from the upstream inlet end 14—in relation to the conveying direction 4—to the downstream outlet end 15, wherein mold block pairs 13 following behind one another in the conveying direction 4 in turn abut one another. The mold block halves 12, 12*a* guided together on a molding section 16 to form mold block pairs 13, in each case, are driven by means of a drive motor 17. The transportation of the mold block halves 12, 12*a* and the mold block pairs 13 on the machine table 11 is shown and described in detail in EP 0 764 516 B1 (corresponding to U.S. Pat. No. 5,693,347), to which reference may be made.

The cross pipe head 5 has two melt channels arranged concentrically with respect to a common centre longitudinal axis 18, namely an inner melt channel 19 and an outer melt channel 20, which—in relation to the conveying direction 4—end downstream in an internal nozzle 21 or an external nozzle 22. The inner melt channel 19 is connected to a melt channel 23 of the extruder 1 arranged aligned with the corrugator 6, whereas the outer melt channel 20 is connected to the melt channel 9 of the other extruder 2. An annular-cylindrical support air and venting channel 24, which is concentric with respect to the axis 18, opens out of the pipe head 8 between the internal nozzle 21 and the external nozzle 22. At the downstream end of the pipe head 8—in relation to the conveying direction 4—a calibrating mandrel 25 is attached thereon and also runs concentrically with respect to the axis 18.

The pipe head 8, in other words the extrusion tool, is multi-part in construction. The inner melt channel 19 is limited by an internal nipple 26 and an internal die 27. The outer melt channel 20 is limited by an external nozzle mandrel 28 and an external nozzle casing 29, the description—in relation to the axis 18—having taken place from the inside to the outside. The support air and venting channel 24 is configured between the internal die 27 and the external nozzle mandrel 28, and specifically as an annular-cylindrical channel 24, which is concentric with respect to the axis 18.

On the pipe head 8, in other words on its external nozzle casing 29, there is provided—in relation to the conveying direction 4—upstream of the external nozzle 22, a cylindrical external face 31, which is exchangeably attached and formed from half shells 30, between which and the mold block halves 12, 12*a*, an annular sealing gap 32 is formed. This configuration is shown and described in detail in EP 11 184 779.4, to which reference is made.

The mold block halves 12, 12*a* have annular mould recesses 33, which are arranged one behind the other at regular intervals and which are, in each case, connected to partial vacuum channels 34. At the inlet of the mold block halves 12, 12*a* into the molding section 16, the partial vacuum channels 34 arrive at partial vacuum supply sources, not shown, shown and described in EP 11 184 779.4, so the mould recesses 33 are subjected to a partial vacuum.

The plastics material melt supplied from the extruder 2 through the melt channel 9 to the pipe head 8 flows through the outer melt channel 20 to the external nozzle 22 and is extruded there while forming an external hose 35. Because of the partial vacuum and because of the support air supplied through the support air and venting channel 24, this external hose 35 is placed, while forming a tube configured with annular corrugations 36, in the mould recesses 33. Plastic material melt is supplied from the extruder 1 through the melt channel 23 to the cross pipe head 8 and flows through the inner melt channel 19 to the internal nozzle 21 and leaves from there as an internal hose 37, which arrives on the calibrating mandrel 25. The latter widens slightly outwardly from the internal nozzle 21 in the conveying direction 4, until the internal hose 37 arrives against the corrugation valleys 38 of the external hose 35 and is welded thereto here. The internal hose 37 and the external hose 35 form the twin wall pipe 10 after cooling while solidifying.

Figure 2:
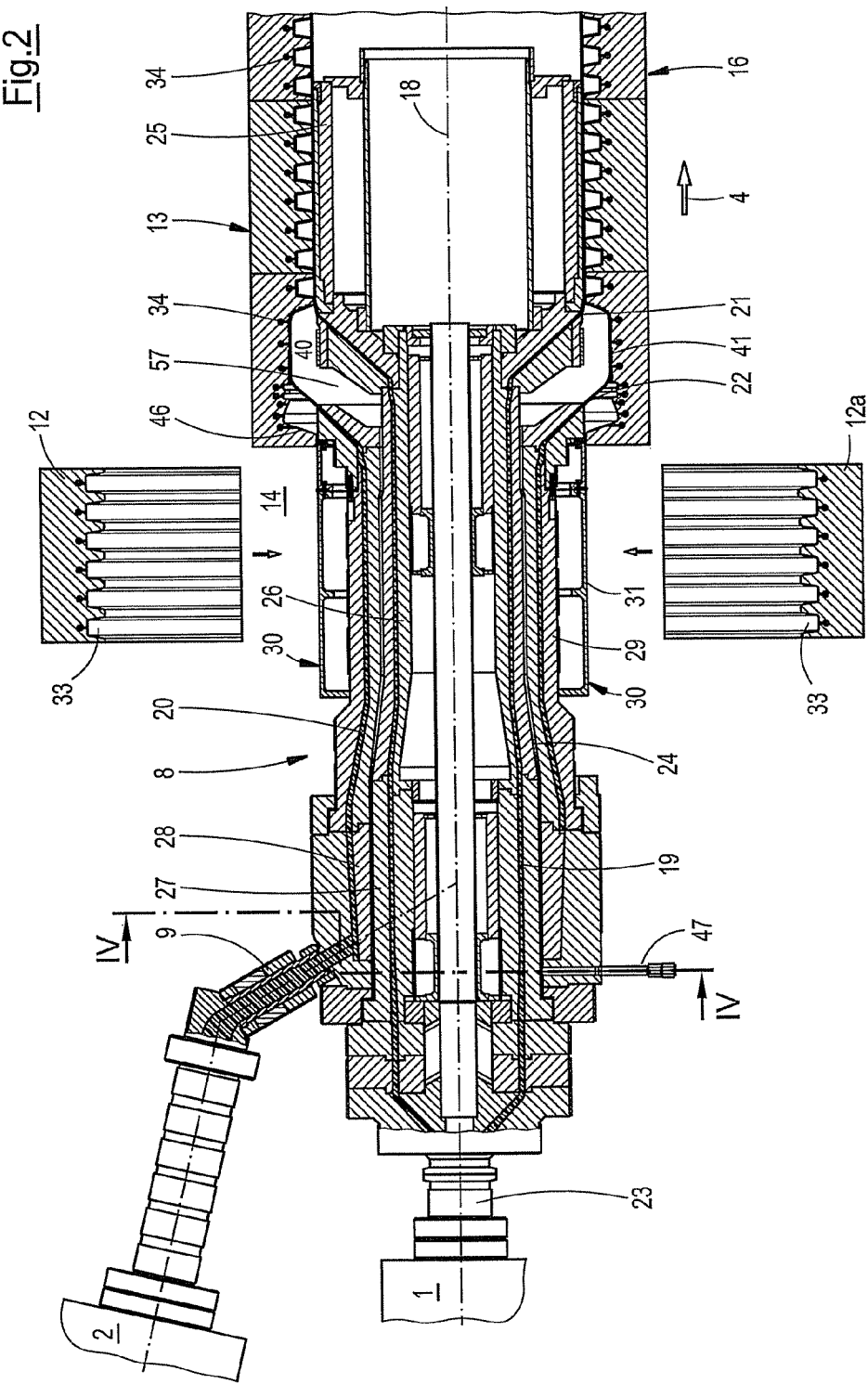
FIG. 2 shows a pipe head and the inlet end of the corrugator in a horizontal section.
Figure 3:
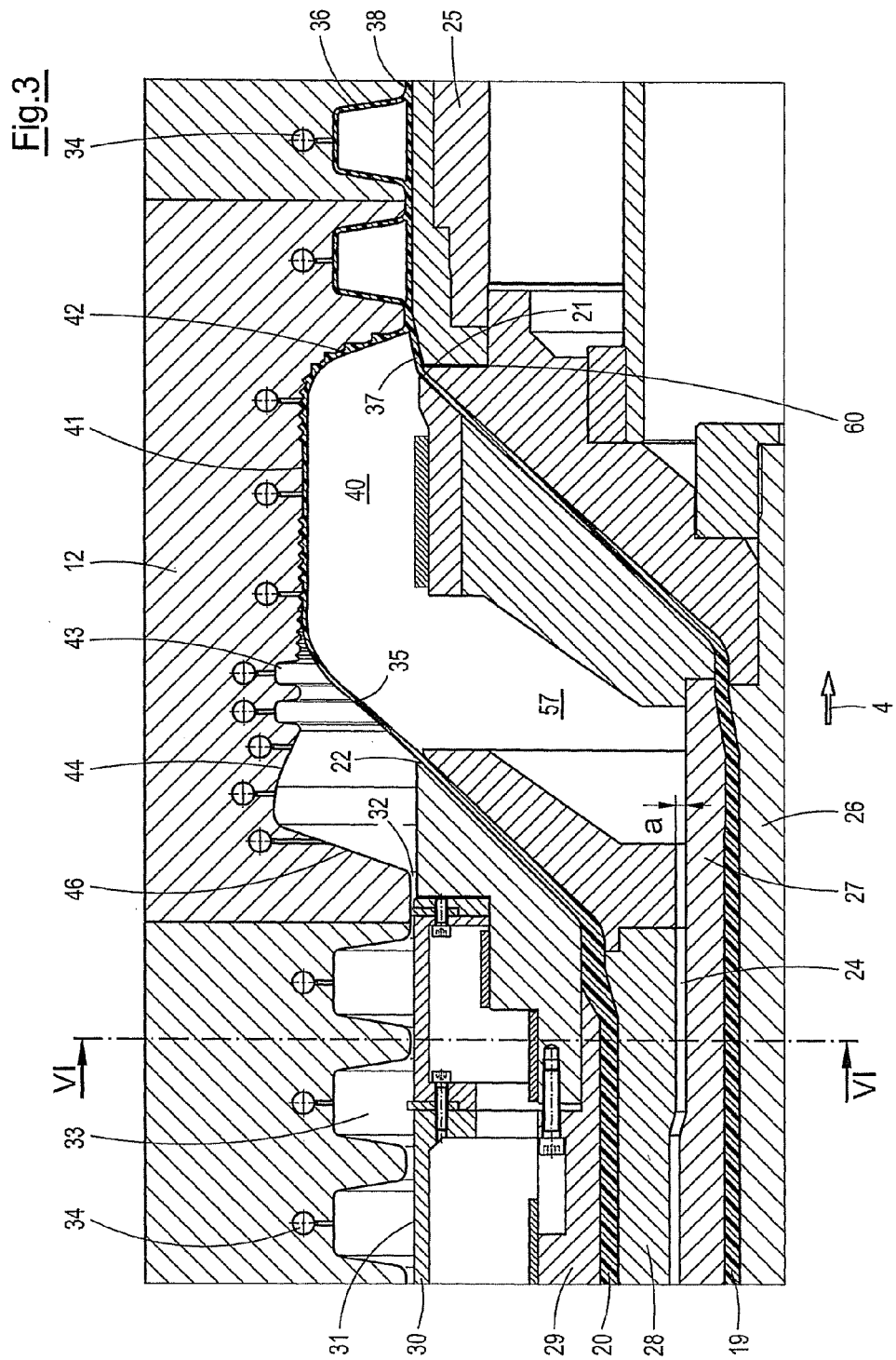
FIG. 3 shows a partial section from FIG. 2 to an enlarged scale compared with FIG. 2.

As can be seen, in particular from FIGS. 2 and 3, the mold block halves 12, 12*a* are formed in such a way that integral sockets 39 are in each case formed at predetermined intervals within the continuously produced twin wall pipe 10. For this purpose, a socket recess 40 is formed in a pair of mold block halves 12, 12*a* and thus has a substantially smooth, cylindrical wall 41. A transition face 42 is formed between the wall 41 of the socket recess 40 and the mould recess 33 upstream in the conveying direction 4. Adjoining the—in relation to the conveying direction 4—downstream end of the wall 41 of the socket recess 40 are peripheral grooves 43 to reinforce the integral socket 39 and a truncated cone-shaped molding portion 44, in which an outwardly widening introduction end 45 of the socket 39 is formed. A transition face 46 which leads to the next—downstream in the conveying direction 4—mould recess 33, in turn adjoins this.

The support air and venting channel 24 extends—as can be inferred from FIG. 2—over a substantial part of the extent of the pipe head 8 in the direction of the axis 18. In the region of the—in relation to the conveying direction 4—upstream end of the pipe head 8, a support air supply pipe 47 opens, as can be inferred, in particular, form FIGS. 2 and 4, into the support air and venting channel 24. Said support air supply pipe is connected by a support air line 48 to a compressed air source 49. In this order, proceeding from the compressed air source 49—arranged in the support air line 48—are a manually adjustable pressure regulator 50, an activatable solenoid valve 51 and a pressure measuring device 52. A venting line 53, which is constantly open to the atmosphere, opens out from the support air and venting channel 24.

Figure 4:
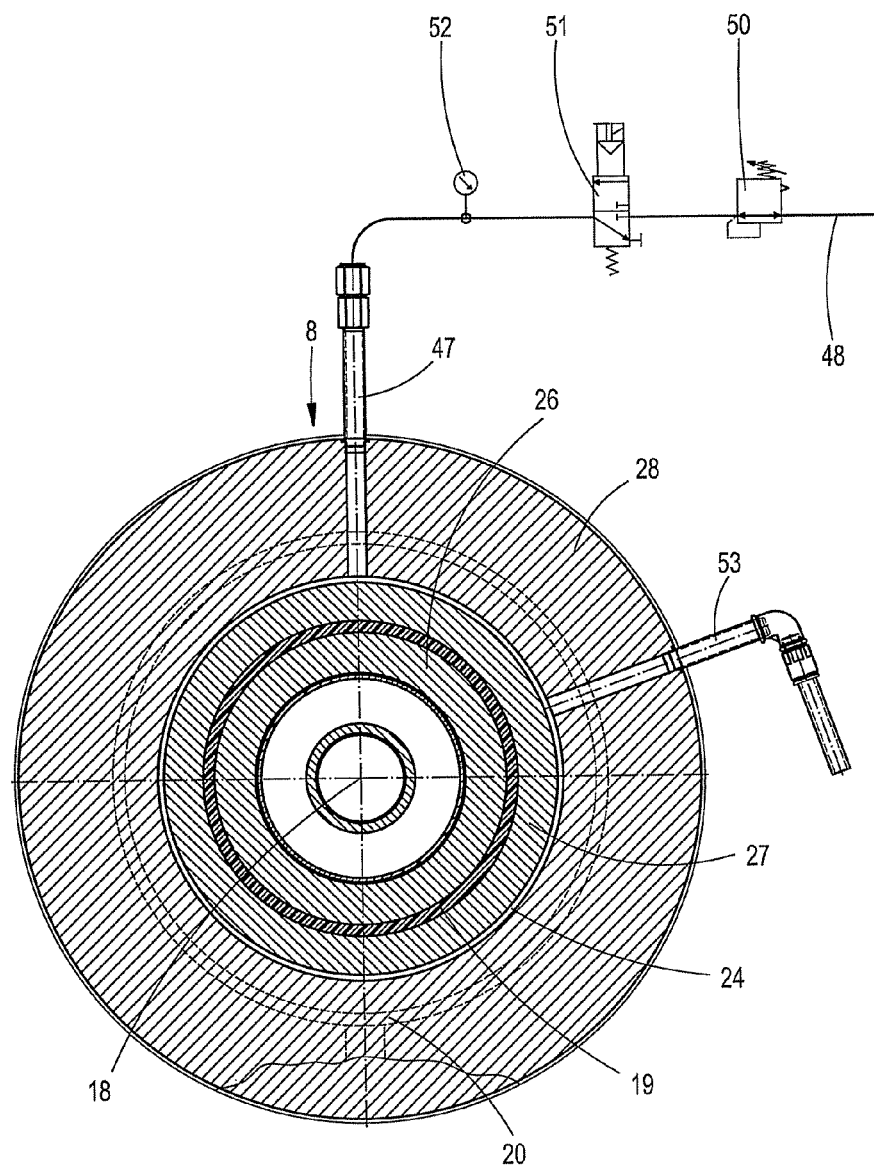
FIG. 4 shows a cross section through FIG. 2 in accordance with the section line IV-IV in FIG. 2.
Figure 5:
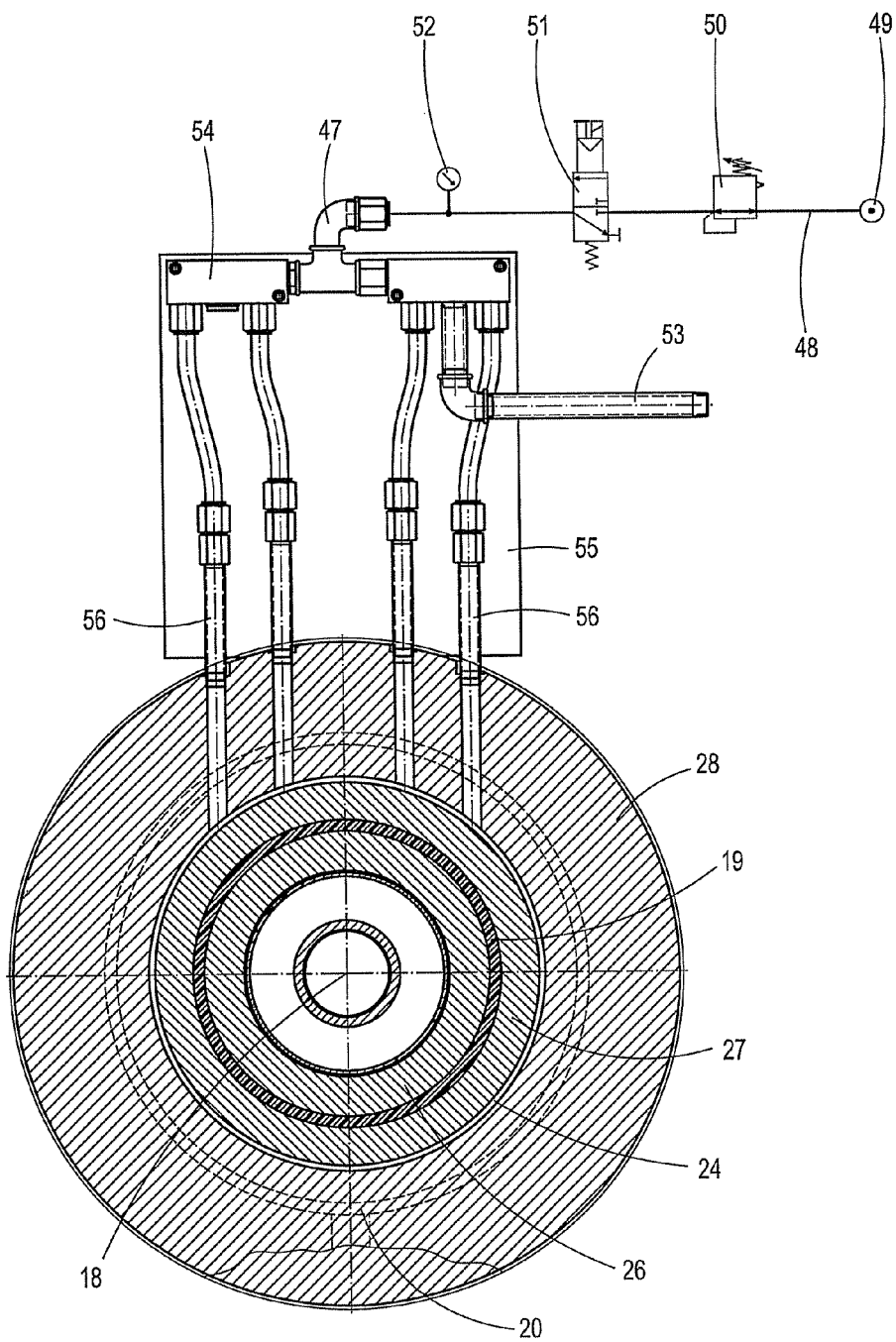
FIG. 5 shows a cross sectional view modified compared to FIG. 4.

FIG. 5 shows a variant with respect to the configuration according to FIG. 4. An air distributor housing 54 is supported here by means of a support plate 55 on the pipe head 8. The support air line 48 opens centrally into the air distributor housing 54. A plurality of, in the present case four, support air and venting lines 56 lead into the support air and venting channel 24. A venting line 53, which is constantly open to the atmosphere, also opens out from the air distributor housing.

Figure 6:
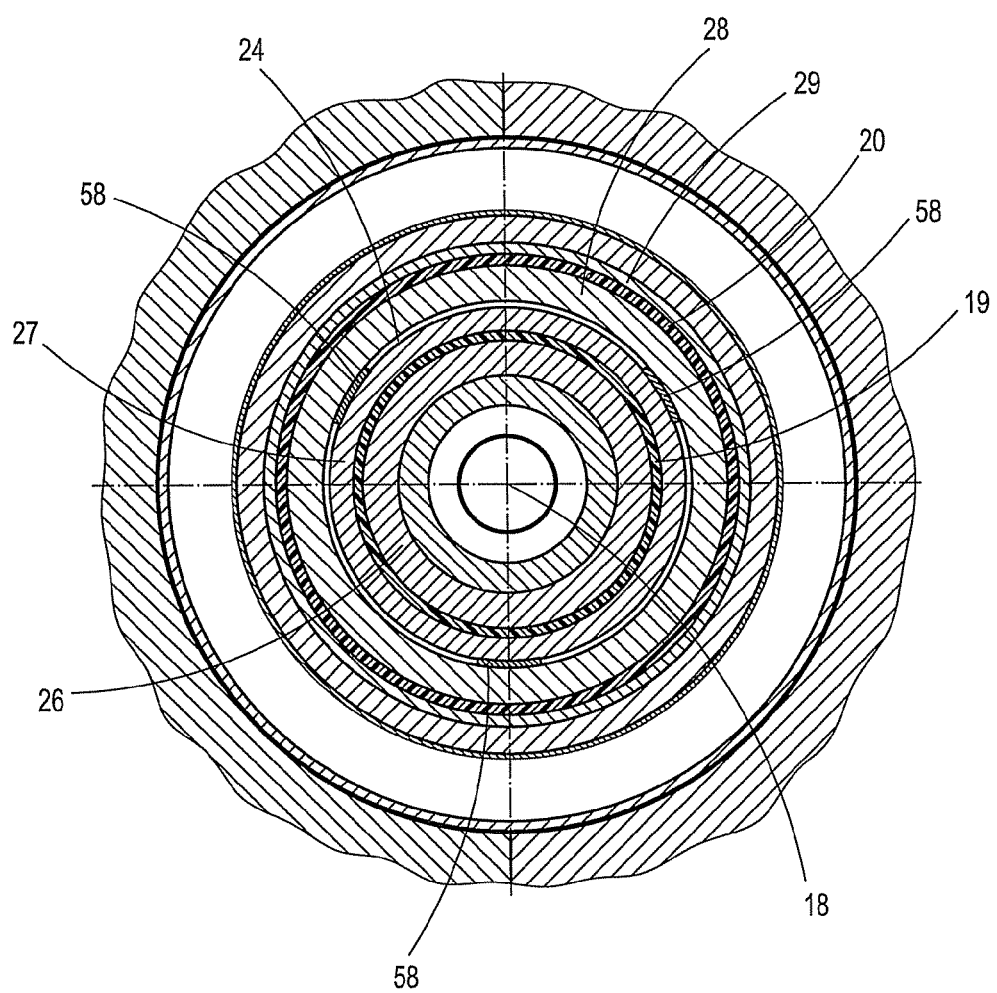
FIG. 6 shows a section through FIG. III, in accordance with the section line VI-VI in FIG. 3.

As can be inferred from FIG. 6, a plurality of centering pieces 58, which are offset relative to one another through 120° in the present example, are provided in the support air and venting channel 24 directly before the exit space 57 thereof between the external nozzle 22 and the internal nozzle 21 in order to support and to centre the external nozzle mandrel 28 with the parts lying radially outside relative to the internal die 27 and the parts located therein. These centering pieces 58 are dimensioned such that an adequately large free cross section remains in the support air and venting channel 24, 24'.

Figure 7:
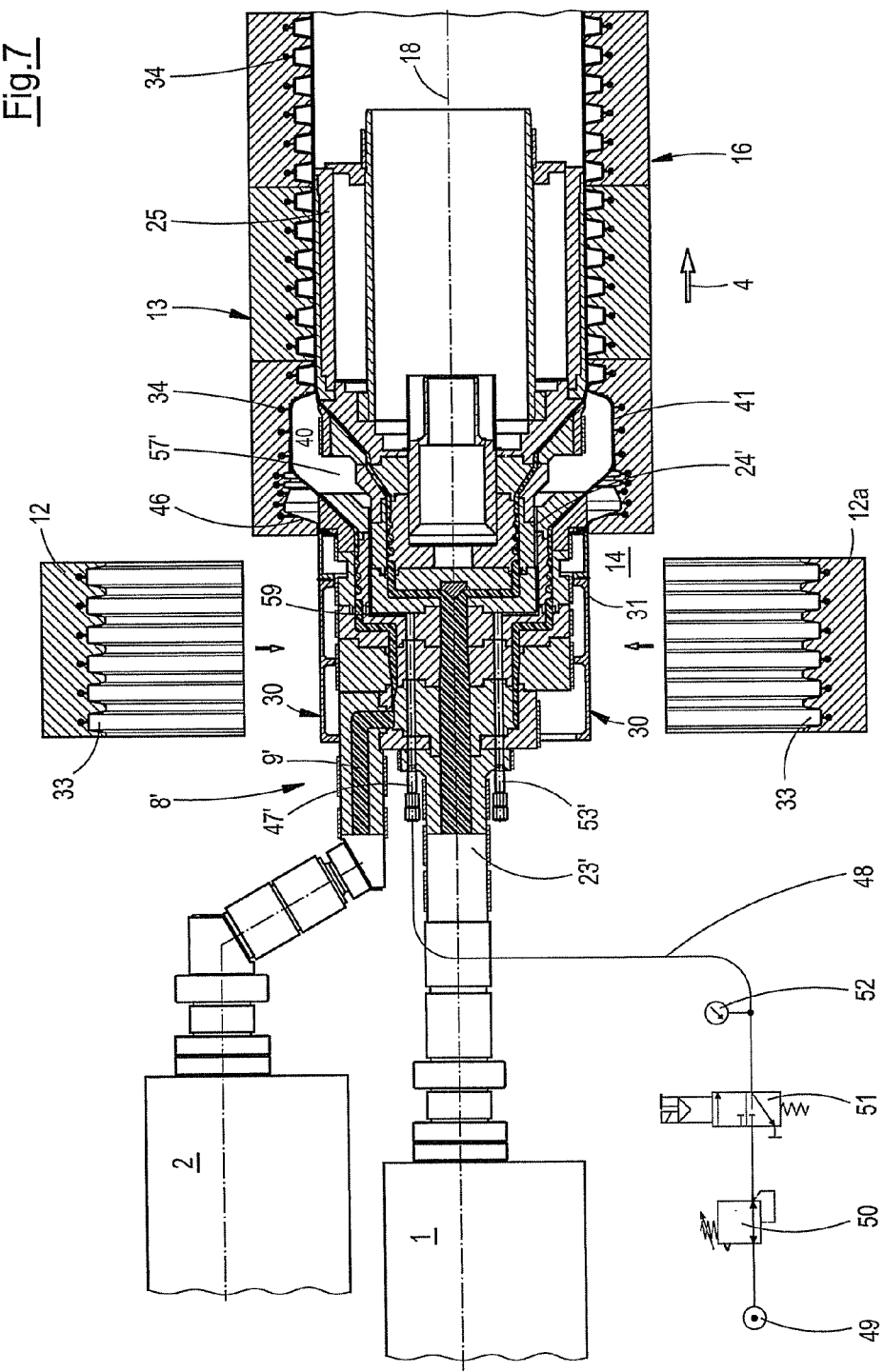

FIGS. 7 and 8 show a modified cross pipe head 8', in other words a modified extrusion tool, which is a so-called star distributor. This configuration is used, in particular, in the production of pipes with a very large diameter, as in the conventionally described configuration of the pipe heads, their weight is too great. A cross pipe head 8' of the type, as shown in FIGS. 7 and 8, is shown and described in detail in EP 2 116 352 B1, to which reference may be made. Moreover, with the parts of the description to date, the same parts are given the same reference numerals. Functionally the same but structurally different parts are designated by the same reference numerals with an apostrophe, so a detailed description is not necessary.

The internal nipple 26', the internal die 27', the external nozzle mandrel 28' and the external nozzle casing 29' are in each case composed of several parts. The support air and venting channel 24' is configured and arranged annular-cylindrically concentrically with respect to the axis 18 in the region before the exit space 57'.

At least one support air supply pipe 47' runs parallel to the axis through a part of the cross pipe head 8', and specifically between the inner melt channel 19' and the outer melt channel 20'. Arranged accordingly is at least one venting line 53'. The support air supply pipe 47' and the venting line 53' end within the cross pipe head 8' in an annular disc-shaped distributor channel 59, from which the support air and venting channel 24' opens out.

The minimum gap width a of the annular-cylindrical support air and venting channel 24 or 24' is to be adequately large in dimension. There applies: a≥2.0 mm.

During the production of the twin wall pipe 10, a partial vacuum is applied to the partial vacuum channels 34, in other words both to the mould recesses 33 and also to the socket recess 40. During the production of the normal twin wall pipe 10 with corrugations 36, the solenoid valve 51 is opened, so that compressed air is introduced from the compressed air source 49 at a pressure adjusted at the pressure regulator 50 via the support air and venting channel 24 or 24' into the space 57 between the internal hose 37 and the external hose 35. As the channel 24 or 24' is constantly open to the atmosphere, a support air pressure that can be determined in practice is adjusted, which is significantly lower than the preliminary pressure in the support air line 48. Owing to the partial vacuum in the mould recesses 33 and the light support by the support air, the external hose 35 is placed on the wall of the mould recess 33 and the external hose thus formed. The air volumes of the support air in each case fluctuating during the forming of a corrugation 36 or a corrugation valley 38 in the external hose 35 are compensated or buffered by the support air and venting channel 24 or 24'. Pressure control devices for the support air are therefore not necessary. The support air supply is maintained until the transition face 42 of the socket recess 40 reaches the internal nozzle 21, as shown in FIGS. 2 and 3 or 7 and 8. Up to this time, the external hose 35, supported by the partial vacuum, is placed by the slight excess pressure of the support air on the wall 41 of the socket recess 40. This therefore applies to the forming of the external hose 35 to form the twin wall pipe 10 and also, at least in regions, to the forming of the external hose 35 to form the integral socket 39.

In the time mentioned shown in FIGS. 2 and 3 or 7 and 8, the solenoid valve 51 is closed, so the space 57 or 57' is vented via the support air and venting channel 24, 24'. At the same time, via an additional gas channel 60 arranged adjacent to the internal nozzle 21, an internal pressure is provided on the internal hose 37, so the internal hose 37 is placed on the external hose 35 already resting, at least partially, on the wall 41 of the socket recess 40. As the space 57 or 57' is constantly connected to the atmosphere and no more support air is supplied, atmospheric pressure prevails in the space 57 or 57'. The air present therein is displaced with the widening of the internal hose 37 until it rests on the external hose 35 from the space 57 through the support air and venting channel 24 or 24', in other words discharged to the atmosphere.

The pressure drop, in other words the pressure equalization, from the slight excess pressure to atmospheric pressure when closing the solenoid valve 51, takes place briefly, i.e. virtually approximately abruptly; the venting of the space 57 extends over the entire period of the widening of the internal hose 37 to form the integral socket 39.

What is claimed is:

1. An apparatus for the continuous production of a twin wall pipe consisting in a conveying direction of a smooth internal pipe and an external pipe welded thereto and provided with corrugations, and a first centre longitudinal axis,
    wherein mold block halves provided with annular mould recesses, supplementing one another in pairs in each case on a molding section to form a mould with a second centre longitudinal axis, are arranged in a circuit and guided in a conveying direction,
    wherein the mould recesses are connected to partial vacuum channels formed in the mold block halves,
    wherein a pipe head of at least one extruder is arranged upstream of the molding section,
    wherein the pipe head is provided with an external nozzle for the extrusion of an external hose and, downstream in the conveying direction, with an internal nozzle for the extrusion of an internal hose and, at its end located downstream in the conveying direction, with a calibrating mandrel,
    wherein at least one support air channel opens out of the pipe head between the external nozzle and the internal nozzle,
wherein the support air channel is configured as a support air and venting channel, which is constantly open to the atmosphere, is annular-cylindrical at least adjacent to the region between the internal nozzle and the external nozzle and is concentric with respect to the second centre longitudinal axis.

2. An apparatus according to claim 1, wherein at least one additional gas channel opens out of the pipe head between the internal nozzle and the calibrating mandrel, wherein at least one pair of mold block halves is provided with a socket recess, and wherein the socket recess is limited by a transition face, which is upstream in the conveying direction.

3. An apparatus for the continuous production of a twin wall pipe consisting in a conveying direction of a smooth internal pipe and an external pipe welded thereto and provided with corrugations, and a first centre longitudinal axis,
- wherein mold block halves provided with annular mould recesses, supplementing one another in pairs in each case on a molding section to form a mould with a second centre longitudinal axis, are arranged in a circuit and guided in a conveying direction,
- wherein the mould recesses are connected to partial vacuum channels formed in the mold block halves,
- wherein a pipe head of at least one extruder is arranged upstream of the molding section,
- wherein the pipe head is provided with an external nozzle for the extrusion of an external hose and, downstream in the conveying direction, with an internal nozzle for the extrusion of an internal hose and, at its end located downstream in the conveying direction, with a calibrating mandrel,
- wherein at least one support air channel opens out of the pipe head between the external nozzle and the internal nozzle, wherein the support air channel is configured as a support air and venting channel, which is constantly open to the atmosphere, is annular-cylindrical at least adjacent to the region between the internal nozzle and the external nozzle and is concentric with respect to the second centre longitudinal axis, and wherein the support air and venting channel extends over a substantial part of the length of the pipe head.

4. An apparatus according to claim 1, wherein the support air and venting channel has a gap width a, to which there applies: a≥2.0 mm.

5. An apparatus for the continuous production of a twin wall pipe consisting in a conveying direction of a smooth internal pipe and an external pipe welded thereto and provided with corrugations, and a first centre longitudinal axis,
- wherein mold block halves provided with annular mould recesses, supplementing one another in pairs in each case on a molding section to form a mould with a second centre longitudinal axis, are arranged in a circuit and guided in a conveying direction,
- wherein the mould recesses are connected to partial vacuum channels formed in the mold block halves,
- wherein a pipe head of at least one extruder is arranged upstream of the molding section,
- wherein the pipe head is provided with an external nozzle for the extrusion of an external hose and, downstream in the conveying direction, with an internal nozzle for the extrusion of an internal hose and, at its end located downstream in the conveying direction, with a calibrating mandrel,
- wherein at least one support air channel opens out of the pipe head between the external nozzle and the internal nozzle, wherein the support air channel is configured as a support air and venting channel, which is constantly open to the atmosphere, is annular-cylindrical at least adjacent to the region between the internal nozzle and the external nozzle and is concentric with respect to the second centre longitudinal axis, and wherein the support air and venting channel is connected to at least one support air supply pipe.

6. An apparatus according to claim 1, wherein the support air and venting channel is connected to at least one support air line, which is connected to a compressed air source.

7. An apparatus according to claim 1, wherein a pressure regulator, a solenoid valve and a pressure measuring device are arranged upstream of the support air and venting channel.

8. An apparatus for the continuous production of a twin wall pipe consisting in a conveying direction of a smooth internal pipe and an external pipe welded thereto and provided with corrugations, and a first centre longitudinal axis,
- wherein mold block halves provided with annular mould recesses, supplementing one another in pairs in each case on a molding section to form a mould with a second centre longitudinal axis, are arranged in a circuit and guided in a conveying direction,
- wherein the mould recesses are connected to partial vacuum channels formed in the mold block halves,
- wherein a pipe head of at least one extruder is arranged upstream of the molding section,
- wherein the pipe head is provided with an external nozzle for the extrusion of an external hose and, downstream in the conveying direction, with an internal nozzle for the extrusion of an internal hose and, at its end located downstream in the conveying direction, with a calibrating mandrel,
- wherein at least one support air channel opens out of the pipe head between the external nozzle and the internal nozzle, wherein the support air channel is configured as a support air and venting channel, which is constantly open to the atmosphere, is annular-cylindrical at least adjacent to the region between the internal nozzle and the external nozzle and is concentric with respect to the second centre longitudinal axis, and wherein a venting line, which is constantly open to the atmosphere, opens out from the support air and venting channel.

9. An apparatus for the continuous production of a twin wall pipe consisting in a conveying direction of a smooth internal pipe and an external pipe welded thereto and provided with corrugations, and a first centre longitudinal axis,
- wherein mold block halves provided with annular mould recesses, supplementing one another in pairs in each case on a molding section to form a mould with a second centre longitudinal axis, are arranged in a circuit and guided in a conveying direction,
- wherein the mould recesses are connected to partial vacuum channels formed in the mold block halves,
- wherein a pipe head of at least one extruder is arranged upstream of the molding section,
- wherein the pipe head is provided with an external nozzle for the extrusion of an external hose and, downstream in the conveying direction, with an internal nozzle for the extrusion of an internal hose and, at its end located downstream in the conveying direction, with a calibrating mandrel,
- wherein at least one support air channel opens out of the pipe head between the external nozzle and the internal nozzle, wherein the support air channel is configured as a support air and venting channel, which is constantly open to the atmosphere, is annular-cylindrical at least adjacent to the region between the internal nozzle and the external nozzle and is concentric with respect to the second centre longitudinal axis, and wherein arranged upstream of the support air and venting channel is an air distributor housing, into which a support air line opens and from which a venting line opens out, and which is connected by a plurality of support air and venting lines to the support air and venting channel.

10. An apparatus according to claim 3, wherein at least one additional gas channel opens out of the pipe head between the internal nozzle and the calibrating mandrel, wherein at least one pair of mold block halves is provided with a socket recess, and wherein the socket recess is limited by a transition face, which is upstream in the conveying direction.

11. An apparatus according to claim 5, wherein at least one additional gas channel opens out of the pipe head between the internal nozzle and the calibrating mandrel, wherein at least one pair of mold block halves is provided with a socket recess, and wherein the socket recess is limited by a transition face, which is upstream in the conveying direction.

12. An apparatus according to claim 8, wherein at least one additional gas channel opens out of the pipe head between the internal nozzle and the calibrating mandrel, wherein at least one pair of mold block halves is provided with a socket recess, and wherein the socket recess is limited by a transition face, which is upstream in the conveying direction.

13. An apparatus according to claim 9, wherein at least one additional gas channel opens out of the pipe head between the internal nozzle and the calibrating mandrel, wherein at least one pair of mold block halves is provided with a socket recess, and wherein the socket recess is limited by a transition face, which is upstream in the conveying direction.

14. An apparatus according to claim 3, wherein the support air and venting channel has a gap width a, to which there applies: $a \geq 2.0$ mm.

15. An apparatus according to claim 5, wherein the support air and venting channel has a gap width a, to which there applies: $a \geq 2.0$ mm.

16. An apparatus according to claim 8, wherein the support air and venting channel has a gap width a, to which there applies: $a \geq 2.0$ mm.

17. An apparatus according to claim 9, wherein the support air and venting channel has a gap width a, to which there applies: $a \geq 2.0$ mm.

18. An apparatus according to claim 3, wherein the support air and venting channel is connected to at least one support air line, which is connected to a compressed air source.

19. An apparatus according to claim 5, wherein the support air and venting channel is connected to at least one support air line, which is connected to a compressed air source.

20. An apparatus according to claim 8, wherein the support air and venting channel is connected to at least one support air line, which is connected to a compressed air source.

21. An apparatus according to claim 9, wherein the support air and venting channel is connected to at least one support air line, which is connected to a compressed air source.

22. An apparatus according to claim 3, wherein a pressure regulator, a solenoid valve and a pressure measuring device are arranged upstream of the support air and venting channel.

23. An apparatus according to claim 5, wherein a pressure regulator, a solenoid valve and a pressure measuring device are arranged upstream of the support air and venting channel.

24. An apparatus according to claim 8, wherein a pressure regulator, a solenoid valve and a pressure measuring device are arranged upstream of the support air and venting channel.

25. An apparatus according to claim 9, wherein a pressure regulator, a solenoid valve and a pressure measuring device are arranged upstream of the support air and venting channel.

* * * * *